A. T. PRESCOTT.
BEARING.
APPLICATION FILED JUNE 24, 1910.

978,202.

Patented Dec. 13, 1910.

WITNESSES:
Flora Graves
J. Hartmann

INVENTOR
Arthur T. Prescott,
BY
Chapin & Raymond
his ATTORNEYS

UNITED STATES PATENT OFFICE.

ARTHUR T. PRESCOTT, OF EAST ORANGE, NEW JERSEY, ASSIGNOR TO GEORGE H. FROTHINGHAM CO., A CORPORATION OF NEW YORK.

BEARING.

978,202. Specification of Letters Patent. Patented Dec. 13, 1910.

Application filed June 24, 1910. Serial No. 568,638.

*To all whom it may concern:*

Be it known that I, ARTHUR T. PRESCOTT, a citizen of the United States of America, and a resident of East Orange, county of Essex, and State of New Jersey, have invented certain new and useful Improvements in Bearings, of which the following is a specification, reference being had to the accompanying drawings, forming a part thereof.

My invention relates to improvements in bearings, and particularly to an improved form and construction of bearing for vertical shafts or spindles.

The main objects of my invention are to construct a simple and efficient form of bearing for vertical shafts or spindles in which end thrust in either direction is resisted, as well as radial movements of the shaft or spindle, and to provide for a thorough lubrication of the coacting bearing surfaces.

To these ends my invention consists in certain novel details of construction and combinations of parts such as will be fully pointed out hereinafter, and in order that my invention may be thoroughly understood, I will now proceed to describe in detail a construction constituting an embodiment of my invention, having reference to the accompanying drawings illustrating the same, and will then point out the novel features in claims.

Figure 1:
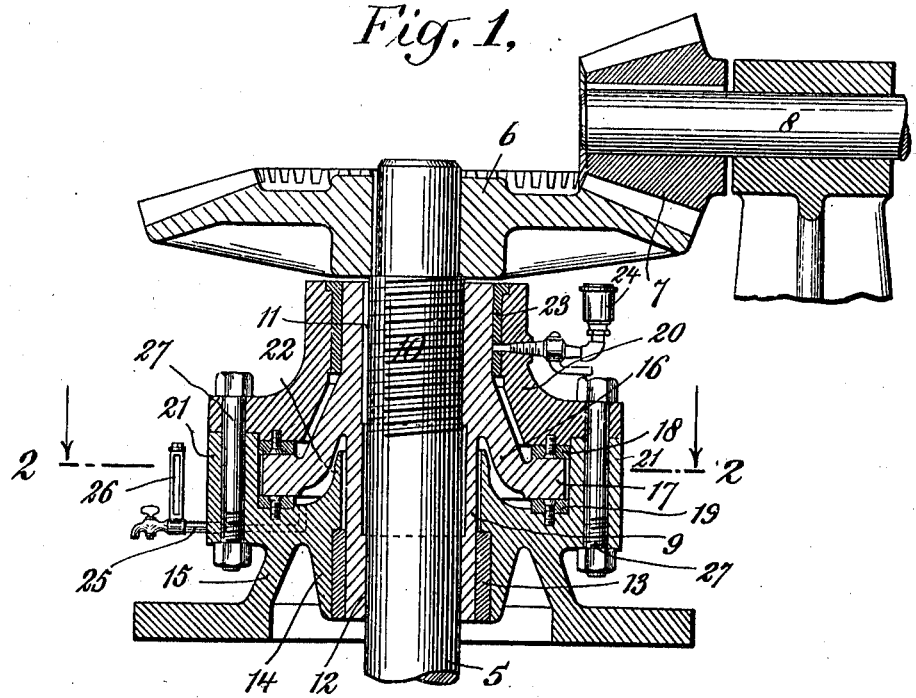
Figure 2:
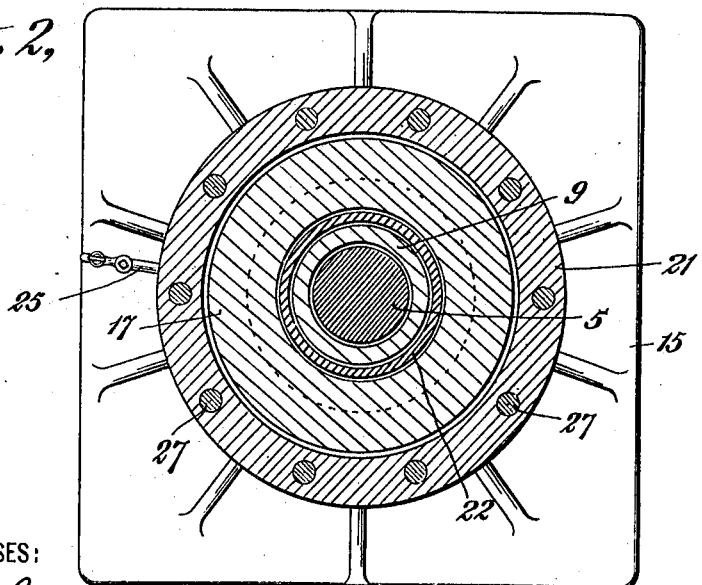

In the drawings: Figure 1 is a view in central vertical section through a bearing constructed in accordance with my invention. Fig. 2 is a view in transverse section therethrough upon the plane of the line 2—2 of Fig. 1.

The element to be supported and guided in the form illustrated in the drawings is a vertical shaft or spindle 5 which may, for instance, be the operating spindle of a gate valve or the like. The spindle is shown as provided with a bevel gear 6 secured fast to the upper end thereof, the teeth of which are disposed in mesh with a pinion 7 mounted fast upon a horizontal operating shaft 8. The spindle is provided near its upper end with a sleeve 9, the upper end of which is secured to the shaft or spindle 5 by a screw threaded connection 10, being held against rotation thereon after the two parts have been assembled by means of a key 11, the lower part of the said sleeve having a portion 12 of reduced diameter which is in intimate frictional engagement with the surface of the spindle 5. The outer surface of the lower end of the sleeve 9 finds a bearing against a bushing 13 mounted in a bearing sleeve 14 dependent from, and preferably integral with, a casing member 15. The said sleeve 9 is also provided with an outwardly and downwardly projecting annular element 16 which connects with the sleeve near the upper end thereof, the lower outer end of the said element constituting a concentric annular ring 17 having upper and lower plane bearing surfaces. These bearing surfaces coact with complementary bearing surfaces comprised in rings 18 and 19, the former being supported within the casing 15, and the latter secured to the lower face of a removable cap or casing element 20, as will be well understood by reference to Fig. 1 of the drawings.

The casing element 15 comprises a suitable base, the said bearing sleeve 14, an outer annular wall 21 which surrounds the annular ring 17 and the bearing rings 18 and 19, and an inner sleeve 22 which rises up between the main portion of the sleeve 9 and the dependent annular element 16, the upper edge of the sleeve being preferably above the level of the bearing surfaces between the bearing ring 18 and the upper face of the annular ring 17. The chamber inclosed between the annular wall 21 and the sleeve 22 constitutes an oil chamber for retaining lubricating material, and by which the bearing surfaces for the annular ring 17 may be maintained in a flooded condition.

The upper casing member or cap 20 is provided at its upper end with a bushing 23, the inner face of which constitutes a bearing surface for the outer face of the upper end of the sleeve 9 as will also be readily understood by reference to Fig. 1 of the drawings. The upper casing member or cap 20 and the lower casing member or base 15 are arranged to be detachably secured together by means of clamping bolts and nuts 27.

From the foregoing it will be seen that two radial bearings are provided for the sleeve carried by the spindle 5, one being afforded by the bushing 23 at the upper end of the bearing, and the other by the bushing 13 at the lower end thereof. In addition thereto end thrust bearings in both directions are afforded by the rings 18 and 19 whereby an effective bearing is provided to prevent longitudinal movements of the spindle in either direction. Lubrication is applied to the upper radial bearing through an oil cup or similar lubricating device 24 while the thrust bearings are maintained constantly lubricated by oil contained in the casing. The oil which flows from the oil cup 24 to the upper radial bearing will work down into the oil chamber within the casing and so constantly renew the oil therein, the surplus oil passing over the upper edge of the sleeve 22 and down the inside thereof to constantly lubricate the lower radial bearing 13. I have provided the oil chamber with a drain pipe 25 through which the oil may be drawn off if such be desired, and also with a gage 26 by which the height of the oil in the chamber may at any time be determined. Oil may be supplied to the casing, if desired, through this drainage pipe 25, or through the gage 26.

It will be readily understood that the foregoing constitutes an exceedingly efficient bearing for vertical spindles, both as to end thrust and radial movements, and that furthermore thorough lubrication is provided for, while waste of the lubricating material is prevented. The thrust bearings being those having the greatest stress, are thoroughly lubricated at all times, yet, while they may be, and preferably are, flooded with oil at all times, such oil is not wasted, but is prevented from flowing away unduly. Such a bearing is particularly adapted for the stems of big sluice valves and gates because in such mechanism the end thrust which is considerable is applied alternately in opposite directions.

What I claim is:

1. The combination with a vertical rotatable spindle, of a sleeve secured fast thereon and rotatable therewith, said sleeve having a portion projecting downwardly therefrom at a point intermediate its ends and including an outwardly extending annular ring having upper and lower bearing surfaces, of a bearing therefor provided with radial bearing elements for co-engagement with the sleeve at the upper and lower ends thereof and with thrust bearing elements for co-engagement with the upper and lower surfaces of the said annular ring, the said thrust bearings being arranged within an oil chamber bounded upon the outside by a casing wall and upon the inside by an uprising sleeve disposed between the body of the said shaft sleeve and the annular ring portion thereof, whereby a sufficient quantity of oil may be retained for constantly flooding the said thrust bearing surfaces.

2. The combination with a vertical rotatable spindle, of a sleeve secured fast thereon and rotatable therewith, the said sleeve having an outwardly projecting portion extending downwardly therefrom at a point intermediate its ends, the lower extremity of the said portion including a further outwardly extending annular ring having upper and lower bearing surfaces, of a bearing therefor provided with radial bearing elements for co-engagement with the sleeve at the upper and lower ends thereof and with thrust bearing elements for co-engagement with the upper and lower surfaces of the said annular ring, the said bearing being provided with an uprising sleeve received between the body portion of the first said sleeve and the said downwardly projecting portion thereof and having outer casing walls, and means for supplying lubricating material to the upper radial bearing, whereby the said lubricating material may flow downward therefrom around the said outwardly and downwardly projecting portion of the sleeve over both the said thrust bearings up and around the bearing upper sleeve and thence down to the lower radial bearing, substantially as set forth.

3. The combination with a vertical rotatable spindle, of a sleeve secured fast thereon and rotatable therewith, the said sleeve having a portion projecting downwardly therefrom at a point intermediate its ends and including an outwardly extending annular ring having upper and lower bearing surfaces, of a bearing therefor comprising a base and a separate cover detachably secured thereto, the said base and cover having radial bearing elements for the said lower and upper ends of the sleeve respectively, and having also end thrust bearings for the lower and upper faces respectively of the said annular ring, the base portion of the said bearing having an uprising oil retaining sleeve disposed between the body portion of the said spindle sleeve and the portion including the said annular ring.

4. The combination with a vertical rotatable spindle, of a sleeve secured fast thereon and rotatable therewith, the said sleeve having radial bearing surfaces toward the upper and lower ends thereof, upper and lower thrust bearing surfaces intermediate the ends thereof, and an annular under-cut recess extending upward to a point above both the lower and upper thrust bearing surfaces, of an inclosed bearing having upper and lower bearing surfaces for co-engagement with the said radial bearing surfaces of the sleeve, and upper and lower thrust bearing surfaces for co-engagement with the thrust bearing surfaces of the said sleeve and provided with an uprising sleeve arranged to enter the said recess, the upper level thereof being above the level of both of the said thrust bearing surfaces, the said bearing and sleeve being provided with annular channels connecting the lower radial bearing surfaces with the lower thrust bearing surfaces, the lower thrust bearing surfaces with the upper thrust bearing surfaces and the upper thrust bearing surfaces with the upper radial bearing surfaces, and means for admitting lubricating material to the upper radial bearing surfaces.

ARTHUR T. PRESCOTT.

Witnesses:
D. E. DEUTSCH,
JAMES A. WILSON.